Dec. 6, 1966 W. A. KULSON 3,289,275
MILLING CUTTER
Filed March 25, 1966

INVENTOR
WALTER A. KULSON
ATTORNEY

United States Patent Office 3,289,275
Patented Dec. 6, 1966

3,289,275
MILLING CUTTER
Walter A. Kulson, 30034 Paul Court, Warren, Mich.
Filed Mar. 25, 1966, Ser. No. 537,479
2 Claims. (Cl. 29—105)

This invention relates to milling cutters and particularly to a milling cutter having replaceable blades. This application is a continuation-in-part of my co-pending application Serial No. 349,656 filed March 5, 1964, now abandoned.

An object of the invention is to provide a milling cutter which is simple in design and construction, economical to manufacture, easy to use, and which quickly, easily, and accurately mounts and secures multiple replaceable blades to facilitate economical accurate use.

Another object of the invention is to provide a milling cutter having two main structural parts and multiples two locking parts so that a minimum of manufacturing components is required.

Another object of the invention is to provide an adjustable and replaceable blade milling cutter which secures the blade in accurate adjusted relationship to insure accurate work and uniform blade working.

These and other objects of the invention will become apparent by reference to the following description of an exemplary milling cutter embodying the invention taken in connection with the accompanying drawings showing a preferred embodiment, in which.

Figure 1:
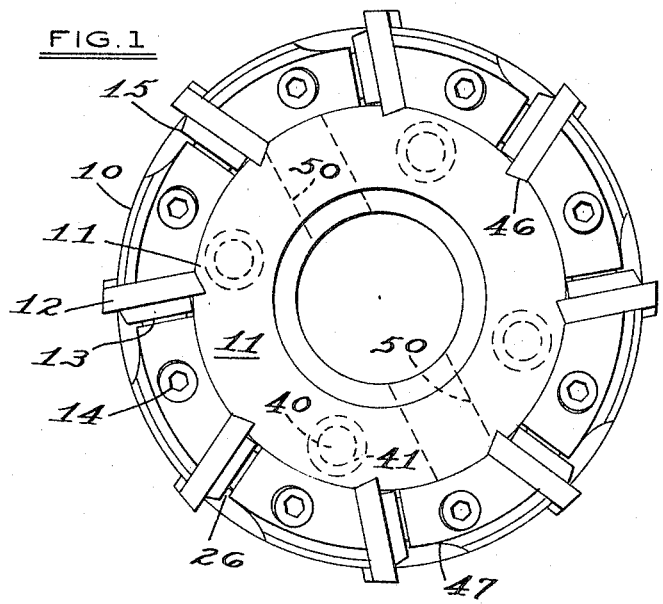
FIG. 1 is a top plan view of the cutter of the invention showing blades mounted thereon and showing connecting bolts and a keyway in dotted lines.

Referring now to the drawings wherein like numerals refer to like and corresponding parts throughout the several views, the novel milling cutter preferred embodiment disclosed therein to illustrate the invention comprises a circular body 10, a plug-core 11, a plurality of blades 12, a lock-slide 13 at each blade 12, and a key 14 operating each lock-slide 13. A chip-breaker spacer 15 may be used at each blade 12.

More particularly, the circular body 10 has a central axis, a top face 20 and a bottom face 21 normal to the central axis. An axial aperture 22 leads through the bottom face 21 and a counterbore 23 leads through the top face 20 forming and defining an apertured flat bottom wall 24 at the bottom face 21 and also forming and defining an upstanding annular peripheral side wall crown 25 rising above the bottom wall 24.

A plurality of radial slots 26 interrupt the side wall crown 25. These slots are preferably at an angle to radii to locate the blades 12 at the same angle. The slots 26 form crown segments 27 lying between the slots 26.

Each crown segment 27 has a radially outer arcuate face 28 on the radius of the body 10, a radially inner arcuate face 29 on the radius of the counterbore 23, a blade abutting leading radial face 30, and blade locking trailing radial face 31. Each crown segment 27 also has a lock-slide slot 32 extending circumferentially and opening radially inwardly through the inner arcuate face 29. The slot 32 also opens through the trailing face 31 of each crown segment 27. The slot 32 may also open through the leading face 30 of each crown segment 27 as shown.

Each crown segment 27 also has a threaded key aperture 33 lying axially or at an angle to the axial so as to be transverse to the slot 32. Each threaded aperture 33 leads into each slot 32.

The lock slide 13 lies in each slot 32. Each lock slide 13 has a transverse cam aperture 35. A cam key 36 is threaded in each threaded aperture 33. Each cam key 36 has an eccentric cam tang 37 lying in the cam aperture 35 of each lock slide 13. Each cam-key 36 has a turning head 38 such as like an Allen-Head bolt.

In assembling the device so far described, the lock slides 13 are placed in the slots 32. The cam keys 36 are then threaded in the threaded apertures 33 until their cam tangs 37 fully engage the cams apertures 35 of the lock slides 13. The lock slides 13 freely reciprocate while the cam keys 36 are being threaded to the proper location. The threaded engagement then holds the cam key 36 in position and the cam tang 37 holds the lock slides 13 in engagement.

The core or plug 11 is then placed in the counterbore 23 sealing off the slots 32 circumferentially, radially, inwardly and containing the lock slides 13 against radial inward movement. The plug 11 has threaded axially parallel apertures 40 and the body 10 flat bottom wall 24 has cooperating openings 41. Bolts 42 extend through the openings 41 and are threaded in the apertures 40 of the plug 11 securely inter-connecting the body 10 and plug 11 together.

The plug 11 has an axial aperture 43 substantially the same size as the aperture 22 in the body 10. The plug 11 also has a counterbore 44. The aperture 43 and counterbore 44 form an annular flange 45 in the plug 11 superposed on the flat bottom wall 24 of the body 10. The plug 11 is preferably grooved at the radial slots 26 forming notches 46. The notches receive the radially inner edges of the blades 12. Preferably the radial slots 26 are wide enough to also receive the chip-breaker spacers 15 but they may be so formed that the spacer 15 is not used at the blade 12.

To insert the blades 12 and spacers 15, the lock slides 13 are retracted. This is done by rotating the turning heads 38 to swing the cam tangs 37 180° away from the trailing face 31. The blades 12 and spacers 15 are then inserted. The turning heads 38 are then rotated such as by an Allen wrench. This swings the cam tangs 37 from their retracted position and cams the lock slides 13 in the advance direction against the spacer 15 which forces the blade against the adjacent abutting leading face 30. This secures and locks the blades in position. The body 10 preferably has relieved portions 47 on each crown segment 27 leading each blade 12 for chip disposal.

Figure 2:
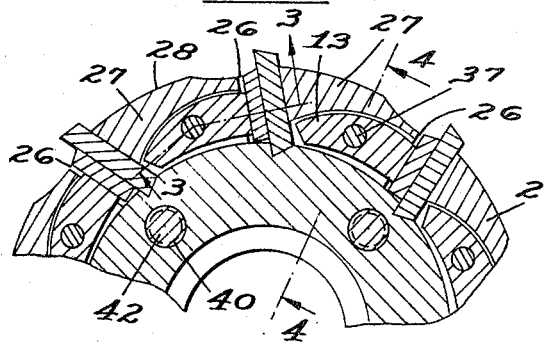
FIG. 2 is a partial horizontal cross-sectional view of the device seen in FIG. 1, such as taken on the line 2—2 of FIG. 3.
Figure 3:
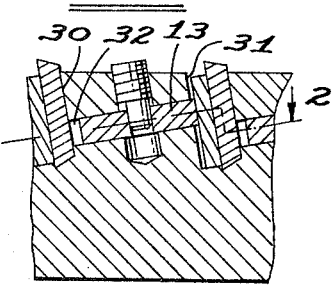
FIG. 3 is a partial vertical cross-sectional view of the device seen in FIG. 1, such as taken on the line 3—3 of FIG. 2.
Figure 4:
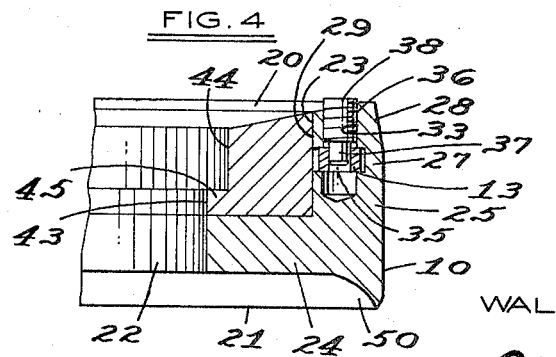
FIG. 4 is a partial transverse cross-sectional view of the device seen in FIG. 1, such as taken on the line 4—4 of FIG. 2.

The radial slots 26, while preferably located at an angle to radii as seen in FIGS. 1 and 2, are also preferably located on an angle to the axial as seen in FIG. 3. This forms the opposed leading face 30 and the trailing face 31 of adjacent crown segments 27 on a compound angle. Thus the blades 12, when clamped and locked, are positioned on a compound cutting angle.

The body 10 is mounted on a milling machine with a key in the keyway 50 for rotational drive. A draw bolt is inserted in the axial aperture 22. The draw bolt has a shoulder engaging the flange 45. This holds the cutter on the machine axially.

From the foregoing it will be understood that each blade 12 may be loosened, adjusted, changed, or replaced with ease and facility by simply rotating the turning head 38 of the cam key 36 through a half turn which retracts the lock slide 13. The blade 12 may then be easily tightened by simply rotating the turning head 38 in the opposite direction advancing the lock-slide 13 into jamming relationship against the blade 12.

While a cutter with eight blades has been shown, it is obvious that other numbers of blades may be selected and that many changes may be made in the size, shape, detail, and arrangements of the various elements of the invention within the scope of the appended claims.

I claim:

1. A milling cutter head having means for receiving, mounting, locating and securing multiple blades in proper cutting position wherein the blades are easily locked and unlocked for use and replacement respectively, comprising a circular body having an axis, top and bottom faces normal to said axis, and internal axial aperture leading through said bottom face, and a counterbore leading through said top face; said aperture and counterbore defining an apertured flat bottom wall at said bottom face and an upstanding annular peripheral side wall crown rising above said flat bottom wall;

said annular peripheral side wall having a plurality of radial slots dividing said annular peripheral side wall into circularly oriented and circumferentially spaced crown-segments;

each said crown-segment having a radially outer arcuate face on the radius of said body, a radially inner arcuate face on the radius of said counterbore, a leading blade-abutting radial face, and a trailing blade-locking radial face;

each said crown-segment having a lock-slide circumferential slot opening radially inwardly and opening tangentially through said locking face;

a lock-slide in each said lock-slide slot having a transverse cam aperture;

each said crown-segment having a threaded key-aperture leading transversely to said lock-slide slot;

a threaded key threaded in each said key aperture having an eccentric cam tang lying in said cam aperture of each said lock-slide;

an annular plug lying in said counterbore of said body having an outer peripheral wall abutting said inner arcuate faces of said crown segments preventing radially inward movement of said lock slides from said lock slide slots and a bottom face abutting said body flat bottom wall;

means securing said plug and body together;

said milling cutter head being mountable on the spindle of a milling machine via said axial apertures of said body and plug and securable thereto by means abutting said plug annular flange superposed on said body flat wall;

cutter blades on said head in said radial slots of said body peripheral side wall lying between one said crown-segment blade abutting leading radial face and said blade-locking trailing radial face of a said adjacent crown-segment;

said lock-slide of each said adjacent crown-segment being advanced into forced jamming engagement with each said cutter blade by turning said threaded key to rotate said eccentric cam tang relative to said lock-slide cam aperture to cam said lock-slide against said blade.

2. An annular milling cutter head having a plurality of spaced adjacent crown-segments with mating opposed leading and trailing blade engaging faces, each said crown-segment having a circumferential slot leading through its trailing face;

a lock slide in each said slot having a cam opening;

each said crown segment having a threaded aperture leading to said slot and lying transverse to said slot;

a key threaded in each said aperture having an eccentric cam tang lying in said cam opening of said lock slide for advancing said lock slide outwardly and inwardly relative to said trailing face on each said crown-segment;

a blade positioned in the space between adjacent crown-segments abutting said leading face;

said lock slide being advanced into jamming relationship against said blade by turning said cam key to swing said cam tang against said cam opening of said lock slide;

said key maintaining its angular position jamming said lock slide against said blade by the binding effect of said eccentric cam tang under forcing conditions on the threaded engagement of said key in said crown-segments.

No references cited.

WILLIAM W. DYER, JR., *Primary Examiner.*

HARRISON HINSON, *Examiner.*